United States Patent
Tomizawa et al.

[11] Patent Number: 5,976,658
[45] Date of Patent: Nov. 2, 1999

[54] OPTICAL INFORMATION RECORDING MEDIUM

[75] Inventors: Yuji Tomizawa; Toru Fujii; Emiko Hamada, all of Tokyo, Japan

[73] Assignee: Taiyoyuden Co., Ltd., Tokyo, Japan

[21] Appl. No.: 08/958,372

[22] Filed: Oct. 27, 1997

[30] Foreign Application Priority Data

Nov. 1, 1996 [JP] Japan ................................. 8-305470

[51] Int. Cl.$^6$ ........................................................ B32B 3/00
[52] U.S. Cl. ...................... 428/64.1; 428/64.4; 428/64.8; 428/457; 428/913; 430/270.18; 430/270.2; 430/495.1; 430/945; 369/283; 369/288
[58] Field of Search .................................. 428/64.1, 64.2, 428/64.4, 64.8, 457, 913; 431/270.18, 270.19, 270.2, 495.1, 945; 369/283, 288

[56] References Cited

U.S. PATENT DOCUMENTS

| | | |
|---|---|---|
| 5,154,958 | 10/1992 | Namba et al. . |
| 5,547,727 | 8/1996 | Shuttleworth et al. ................ 428/64.1 |
| 5,547,728 | 8/1996 | Cunningham et al. ................ 428/64.1 |
| 5,667,860 | 9/1997 | Burns et al. .......................... 428/64.1 |
| 5,679,430 | 10/1997 | Shinkai et al. ........................ 428/64.1 |

FOREIGN PATENT DOCUMENTS

| | | |
|---|---|---|
| 76751A1 | 10/1995 | European Pat. Off. . |
| 3281287 | 12/1991 | Japan . |
| 7262604 | 10/1995 | Japan . |
| 7309069 | 11/1995 | Japan . |
| 08282107 | 10/1996 | Japan . |

OTHER PUBLICATIONS

Masatoshi et al., Patent Abstracts of Japan, vol. 16, No. 111 (M–1223), Mar. 18, 1992, JP 03–281288 A.
Masatoshi et al., Patent Abstracts of Japan, vol. 96, No. 3, Mar. 29, 1996, JP 07–309069 A.

*Primary Examiner*—Elizabeth Evans
*Attorney, Agent, or Firm*—Birch, Stewart, Kolasch & Birch, LLP

[57] ABSTRACT

An optical information recording medium provided on a substrate with a recording layer including a dye layer; wherein the dye layer contains a cyanine dye; and the recording layer enables a recording and reproducing to be effected with a laser beam having a wavelength falling within a range of 620 nm to 690 nm; a refractive index "n" of the recording layer being in a range of 1.6 to 4.0 and an extinction coefficient "k" of the a recording layer being in a range of 0.01 to 0.45 when the laser beam having the wavelength is applied thereto; and the recording layer exhibiting a maximum absorption peak wavelength and a second largest absorption peak wavelength falling within a range of 500 nm to 655 nm as measured by means of a visible ultraviolet spectrometer. The dye may be a trimethine-base cyanine dye.

24 Claims, 4 Drawing Sheets

FIG. 1

(Wavelength = 620nm, n = 4.0)

FIG. 2

(Wavelength = 620nm, k = 0.2)

FIG. 3

(Wavelength = 690nm, n = 4.0)

FIG. 4

(Wavelength = 690nm, k = 0.2)

OPTICAL INFORMATION RECORDING MEDIUM

BACKGROUND OF THE INVENTION

This invention relates to an optical information recording medium of write once (through a heat mode) type such as DVD-R, which is capable of performing a recording or reproducing data by means of a laser beam of a shorter wavelength.

The CD-R is well known as a means for recording and reproducing data such as images of character and graphic or music. The CD-R now available is formed by making use of a recording material, which is capable of recording and reproducing with a laser beam of 770 to 830 nm in wavelength and selected based on its absorbency and optical parameters (in particular, refractive index "n" and extinction coefficient "k"). For example, an optical disk comprising a dye layer containing pentamethine-based cyanine dye is employed.

Recently however, DVD-R (a digital video disk or a digital versatile disk), which is capable of recording and reproducing in high density with a red laser beam of 620 to 690 nm in wavelength for instance, which is shorter than the laser beam employed in the aforementioned CD-R, is now propagated as new media of the next generation.

Since the wavelength zone for performing the recording and reproducing in the DVD-R differs from that of the CD-R, the criteria for selecting the recording material to be employed for the CD-R cannot be applied to the DVD-R, and hence new selection criteria are required to be established from a viewpoint peculiar to the DVD-R.

Since the recording and reproducing of data in the CD-R as a write once type optical information recording medium are performed by making use of a semiconductor laser having a wavelength of 770 to 830 nm ($\lambda_1$), it is considered that a recording layer comprising a dye layer enabling an additional recording should preferably be formed on a transparent substrate in such a manner that the optical parameters in particular, the refractive index "n" and extinction coefficient "k" of the recording layer at the aforementioned $\lambda_1$ fall in the ranges of: 1.6 <n<4.0 and 0.01 <k<0.2 for the purpose of ensuring a suitable reflectance (65% or more) before recording and a modulated amplitude after recording. Namely, if refractive index; n falls outside the aforementioned ranges in the CD-R, it is impossible to assure a reflectance of 65% or more in the recording/reproducing wavelength zone thereof. On the other hand, if extinction coefficient; k falls outside the aforementioned ranges in the DVD-R, it is not only impossible to assure a sufficient reflectance but also impossible to perform a high quality recording. It is generally considered that, in order to assure the aforementioned preferable ranges of these optical parameters n and k, the maximum absorption wavelength $\lambda_2$ of the recording layer should preferably be confined to the range of 600 to 750 nm. However, since the recording and reproducing are performed at a wavelength of 620 to 690 nm ($\lambda_2$) in the DVD-R, i.e. which is far shorter than 770 nm, the aforementioned ranges of n and k, which are preferable for CD-R are no more preferable for DVD-R. Therefore, it is impossible for the DVD-R to suitably perform the recording and reproducing by making use of the recording materials which have been employed for the CD-R.

BRIEF SUMMARY OF THE INVENTION

Therefore a first object of this invention is to provide an optical information recording medium which is formed of a recording material which makes it possible to suitably select an optical parameters and a maximum absorption wavelength in relative to a laser beam of shorter wavelength for performing the recording and reproducing of the DVD-R.

A second object of this invention is to provide an optical information recording medium which makes it possible to select a recording material exhibiting suitable optical parameters by selecting the chemical structure of a dye.

A third object of this invention is to provide an optical information recording medium which makes it possible to select a recording material exhibiting suitable optical parameters by the co-use of a plurality of dyes.

A fourth object of this invention is to provide an optical information recording medium which makes it possible to adjust the recording sensitivity by suitably selecting or controlling the optical parameters thereof.

A fifth object of this invention is to provide an optical information recording medium which makes it possible to adjust the optical parameters without employing additives, to suppress an accumulation of heat during recording, and to perform the recording of lower jitter.

Figure 1:
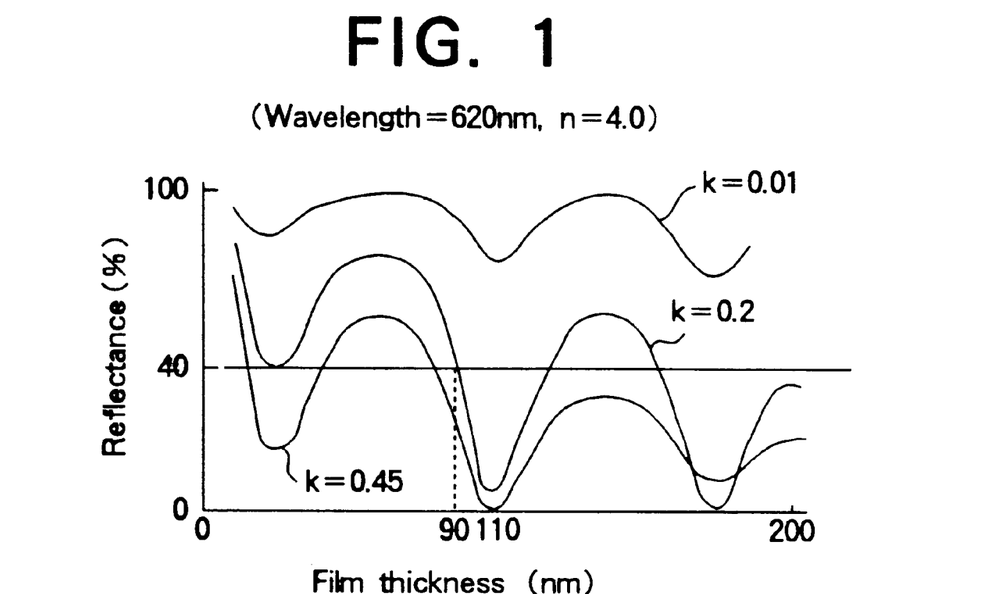
FIG. 1 is a graph showing changes in reflectance in relative to the film thickness as the extinction coefficient "k" was varied under a condition where the refractive index "n" was set to n=4.0 at a wavelength of 620 nm, which were obtained in a simulation.
Figure 2:
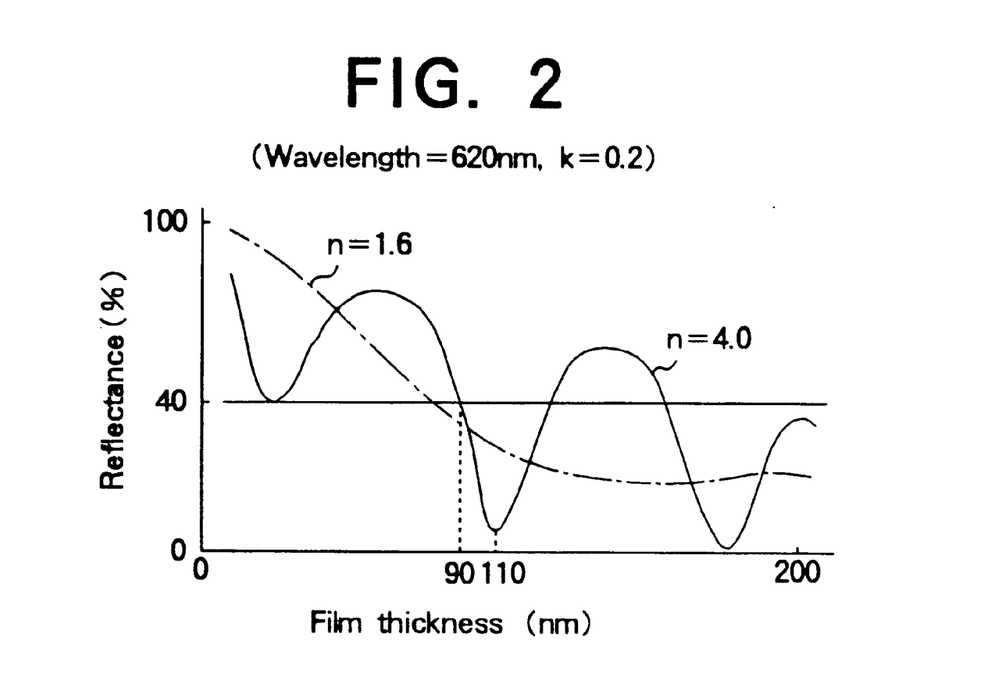
FIG. 2 is a graph showing changes in reflectance in relative to the film thickness as the refractive index "n" was varied under a condition where the extinction coefficient "k" was set to k=0.2 at a wavelength of 620 nm, which were obtained in a simulation.
Figure 3:
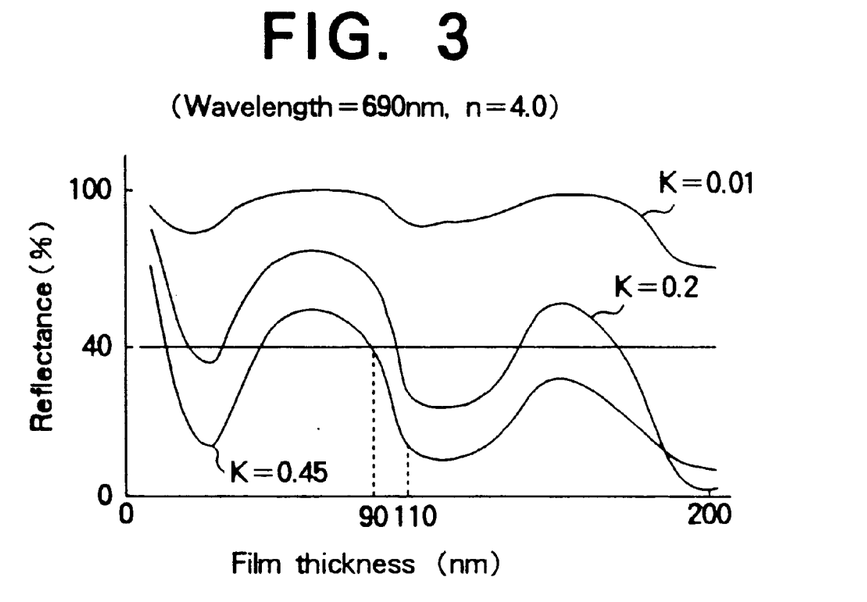
FIG. 3 is a graph showing changes in reflectance in relative to the film thickness as the extinction coefficient "k" was varied under a condition where the refractive index "n" was set to n=4.0 at a wavelength of 690 nm, which were obtained in a simulation.
Figure 4:
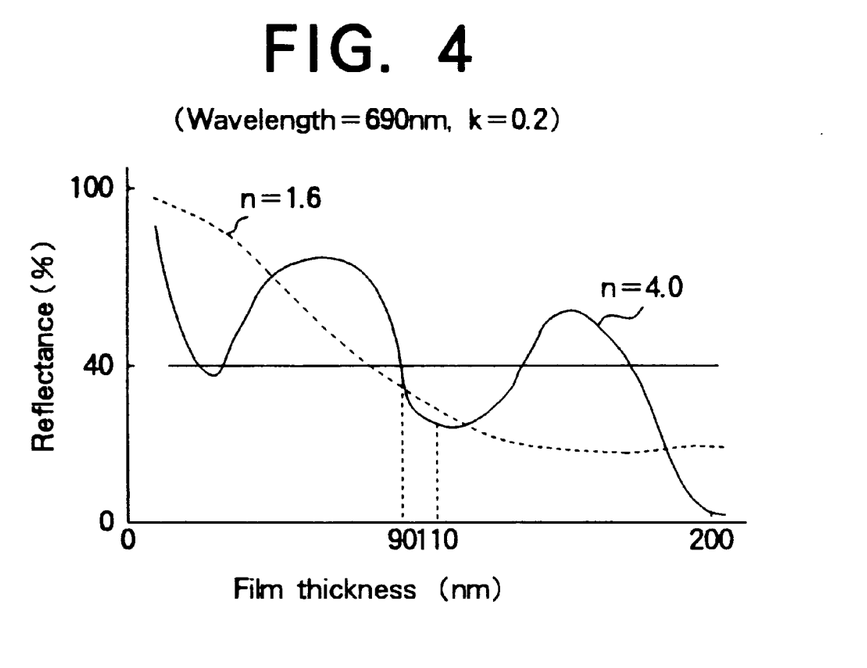
FIG. 4 is a graph showing changes in reflectance in relative to the film thickness as the refractive index "n" was varied under a condition where the extinction coefficient "k" was set to k=0.2 at a wavelength of 690 nm, which were obtained in a simulation.

The present inventors have made an intensive study to solve the aforementioned problems and performed a simulation on the reflectance wherein the recording layer was assumed as exhibiting a refractive index "n" in the range of 1.6 to 4.0 and an extinction coefficient "k" in the range of 0.01 to 0.45 under a wavelength ranging from 620 nm to 690 nm, thereby to obtain the results as shown in FIGS. 1 and 2 (when the wavelength is 620 nm), and FIGS. 3 and 4 (when the wavelength is 690 nm) (the reflectance was calculated according to a method described in "DYESTUFFS & CHEMICALS", Vol.37, No.7, 1992).

It will be seen from these results that since the reflectance of a recording material for CD-R is required to be 65% or more in view of recording, it is impossible to ensure a sufficient reflectance when the extinction coefficient "k" is 0.45. Whereas, in the case of DVD-R, since the reflectance of the recording material is required to be more than 45%, it is possible to perform a recording even if k=0.45 if the film thickness of the recording material is less than 110 nm, more preferably less than 90 nm.

This simulation was performed by making use of a film formed on a substrate having no groove. Therefore, if an actual optical disk which is provided with grooves is employed in this simulation, the reflectance may be lowered more or less. However, even if the interference by these grooves is taken into account, the recording material may be suited for a practical use, since there was a sufficient margin in reflectance (a reflectance higher than 40%) in the aforementioned simulation.

The present inventors have found that when trimethine cyanine dye is employed for instance as a material exhibiting these optical parameters conforming to the wavelength of 620 nm to 690 nm, the maximum absorption wavelength and the second largest absorption wavelength can be confined to 500 nm to 655 nm.

Namely, according to this invention, there is provided (1) an optical information recording medium provided on a substrate with a recording layer including a dye layer; wherein said dye layer contains a cyanine dye; and said recording layer enables a recording and reproducing to be effected with a laser beam having a wavelength falling within a range of 620 nm to 690 nm; a refractive index "n" of said a recording layer being in a range of 1.6 to 4.0 and an extinction coefficient "k" of said a recording layer being in a range of 0.01 to 0.45 when said laser beam having said wavelength is applied thereto; and said a recording layer exhibiting a maximum absorption peak wavelength and a second largest absorption peak wavelength falling within a range of 500 nm to 655 nm as measured by means of a visible ultraviolet spectrometer.

This invention further provides (2) an optical information recording medium as set forth in (1), wherein said dye layer contains one or more kinds of trimethine-based cyanine dye.

This invention further provides (3) an optical information recording medium as set forth in (2), wherein said trimethine-based cyanine dye is a compound represented by the following general formula [1].

This invention further provides (4) an optical information recording medium as set forth in (3), wherein said trimethine-based cyanine dye is an asymmetry trimethine cyanine dye wherein a ring structure "A" differs from a ring structure "A'".

[1]

wherein "A" represents any one of the following general formulas [2], [3], [4] and [5];

[2]

[3]

[4]

[5]

"A'" represents any one of the following general formulas [6], [7], [8] and [9];

[6]

[7]

[8]

[9]

"A" and "A'" may be the same or different from each other (where $D_1$ and $D_2$ may be the same or different from each other and are individually hydrogen atom, alkyl, alkoxy, hydroxyl, halogen atoms, carboxyl, alkoxycarboxyl, alkylcarboxyl, alkylhydroxyl, aralkyl, alkenyl, alkylamide, alkylamino, alkylsufonamide, alkylcarbamoyl, alkylsulfamoyl, alkylsulfonyl, phenyl, cyano, ester, nitro, acyl, allyl, aryl, aryloxy, alkylthio, arylthio, phenylazo, pyridinoazo, alkylcarbonylamino, sulfonamide, amino, alkylsulfone, thiocyano, mercapt, chlorosulfone, alkylazomethine, alkylaminosulfone, vinyl or sulfone group; p and q respectively represents an integer of 1 or more); R and R' may be the same or different from each other and are individually substituted or unsubstituted alkyl, carboxyl, alkoxycarbonyl, alkoxycarboxyl, alkoxyl, alkylhydroxyl, aralkyl, alkenyl, alkylamide, alkylamino, alkylsufonamide, alkylcarbamoyl, alkylsulfamoyl, hydroxyl, halogen atoms, alkylalkoxyl, alkyl halide, alkylsulfonyl, alkylcarboxyl or alkylsulfonyl which are bonded to a metallic ion or alkyl, phenyl, benzyl or alkylphenyl group; and $X^-$ is an anion selected from the group consisting of halogen atoms, $PF_6^-$, $SbF_6^-$, $H_3PO_4$, perchloric acid, hydroborofluoric acid, benzenesulfonic acid, toluenesulfonic acid, alkylsulfonic acid, benzenecarboxylic acid, alkylcarboxylic acid, trifluoromethylcarboxylic acid, periodic acid and $SCN^-$.

This invention further provides specific inventions in which the aforementioned invention is further limited.

Specific examples of trimethine-based cyanine dye are those set forth in the following examples.

In this invention, the recording layer is formed so as to enable a recording and reproducing to be effected with a laser beam having a wavelength falling within a range of 620 nm to 690 nm ($\lambda_2$). This, in turn, means that the recording layer is made available for use in DVD-R.

The expression of the "recording layer" means in this invention not only a recording layer comprising a single or plural dye layers enabling pits to be formed thereon with a laser beam, but also an enhancing layer made of a resin for instance for adjusting the refractive index or film thickness of the optical information recording medium with a view to adjust the optical property of the optical information recording medium, and also an intermediate layer to be interposed between a substrate and a dye layer or between a plurality of dye layers.

Furthermore, in this invention, the recording layer is designed such that the optical parameters thereof, i.e. a refractive index "n" and an extinction coefficient "k" at the aforementioned $\lambda_2$ are confined to the ranges of $1.6<n<4.0$ and $0.01<k<0.45$, and that a maximum absorption peak wavelength and a second largest absorption peak wavelength thereof fall within a range of 500 nm to 655 nm as measured by means of a visible ultraviolet spectrometer. It will be clear from the comparison of these limitations with those of the CD-R that the above limitations on the optical parameters which correspond to the limitations of optical parameters in the CD-R where a laser beam having a wavelength of 770 to 830 nm ($\lambda_1$) is employed differ fundamentally from the limitations of optical parameters in the CD-R though they may be partially overlapped. On the other hand, the above limitation on the maximum absorption peak wavelength can be compared with the maximum absorption peak wavelength of 600 to 750 nm in the CD-R, finding that the range of the maximum absorption peak wavelength is shifted to a lower wavelength side from the range of the maximum absorption peak wavelength in the CD-R.

If the aforementioned optical parameters "n" and "k" fall outside the aforementioned ranges, it becomes impossible to ensure a sufficient reflectance before recording and push-pull before and after recording, so that it would be impossible to assure the tracking during recording and reproducing, and also to assure the modulated amplitude after recording.

It is preferable for the purpose of optimizing the optical properties of the recording layer such as the optical parameters and maximum absorption wavelength to incorporate one or more kinds of trimethine-based cyanine dye having a different optical parameter into a single or plural dye layers included in the recording layer. It is possible with the employment of a dye layer where plural kinds of trimethine-based cyanine dye are contained to obtain a composite spectrum from the combination of absorption spectra of these different kinds of dye so as to make this composite spectrum optimal to the laser beam to be employed for the recording and reproducing in the DVD-R. Namely, it is possible to optimize the optical parameters by mixing plural kinds of dye each differing in optical parameters, thus providing a recording layer comprising an optimized dye layer and hence making it possible to adjust the recording sensitivity.

This trimethine-based cyanine dye is formed of a molecule whose backbone chain contains three carbon atoms, i.e. which is shorter by two carbon atoms as compared with the pentamethine-based cyanine dye which has been employed as a recording material in CD-R. Because of this, it is possible to confine the maximum absorption wavelength and the second largest absorption wavelength to the range of 500 nm to 655 nm, which is shifted to the shorter wavelength side as compared with the range of 600 nm to 750 nm in maximum absorption wavelength of the pentamethine-based cyanine dye. Therefore, it is possible to select a suitable dye exhibiting the aforementioned preferable ranges of optical parameters "n" and "k" from various kinds of trimethine-based cyanine dye, thus obtaining a recording material which enables the recording and reproducing to be performed with a laser beam of shorter wavelength which is suited for use in the DVD-R.

The aforementioned trimethine-based cyanine dye which is applicable in this invention can be optionally selected from the compounds repreformud by the aforementioned general formula [1] wherein "A" can be optionally selected from the general formulas [2], [3], [4] and [5], "A'" can be optionally selected from the general formulas [6], [7], [8] and [9], and "A" and "A'" can be optionally combined. For example, the compounds of the general formulas [2] may be optionally combined with any one of the compounds of the general formulas [6], [7], [8] and [9]. Likewise, the compounds of the general formulas [3], [4] and [5] may be optionally combined with any one of the compounds of the general formulas [6], [7], [8] and [9]. The "p" and "q" in the substituent groups $(D_1)_p$ and $(D_2)_q$ in "A" and "A'" are individually an integer of 1 or more. Preferable examples of this trimethine-based cyanine dye are asymmetric trimethine-based cyanine dyes wherein the ring structures disposed on both sides of the cyanine molecule differ from each other, i.e. it is preferable to employ an asymmetric trimethine-based cyanine dye where the ring structure of "A" disposed on one side of the trimethine chain, which is selected from the general formulas [2], [3], [4] and [5] differs from the ring structure of "A'" disposed on the other side of the trimethine chain, which is selected from the general formulas [6], [7], [8] and [9]. The asymmetric compound of this kind advantageous in that it exhibits an absorption at the aforementioned wavelength $\lambda_2$ which is sharp in absorption wavelength distribution, i.e. short in skirt portion thereof, that it exhibits an improved absorbency per unit film thickness of the dye layer, that it exhibits an improved recording efficiency, that it requires no additive for adjusting the optical parameters, which might be required if the dye layer is constituted by only symmetrical compounds, that it is capable of obtaining an optimal optical parameters by itself thereby making it possible to employ only a single dye component and hence to suppress a heat accumulation and to record with a much lower jitter, and that it is capable of enhancing the recording sensitivity thereof.

R and R' in the aforementioned general formula [1] should preferably be different from each other so as to make it possible to adjust the solubility to a solvent of the dye. A and A' in the aforementioned general formula [1] should preferably be provided with the substituent groups $(D_1)_p$ and $(D_2)_q$ so as to make it possible to control the moisture resistance and weatherability of the dye. The kind of X⁻ may be suitably changed so as to control the heat decomposability of the dye by a laser beam, thereby making it possible to control the shape of pits at the occasion of recording.

It is possible by the employment of the above-mentioned trimethine-based cyanine dye to improve the recording sensitivity of the recording layer to a laser beam having a wavelength ranging from 620 to 690 nm, in particular from 630 to 655 nm, and to provide a DVD-R which is excellent in terms of jitter, modulated amplitude and asymmetry when reproducing (play-back).

The method for synthesizing these dyes can be performed by the method described in "The Chemistry of Synthetic Dyes; Vol. 14".

The manufacture of the optical information recording medium according to this invention can be performed as follows.

First of all, a cyanine dye represented by the aforementioned general formula [1] is dissolved in a solvent to obtain a dye solution, which is then coated on a transparent substrate. The solvent to be employed in the preparation of this dye solution may be selected from chloroform, dichloroethane, a fluorine-based solvent such as fluorinated alcohol, methylethyl ketone, dimethylformamide, methanol, toluene, cyclohexanone, acetylacetone, diacetone alcohol, cellosolves such as methyl cellosolve, and dioxane. The mixing ratio of the cyanine dye in this case should preferably be 1 to 10% by weight.

As for the material for the substrate to be employed in this invention, glass, or plastics such as epoxy resin, methacryl resin, polycarbonate resin, polyester resin, polyvinyl chloride resin and polyolefin resin may be employed. The substrate may be provided in advance with tracking grooves or pits, which may be provided with a signal required for an address signal.

The coating of the aforementioned cyanine dye on a substrate should preferably be performed by means of a spin-coating method. The film thickness after being dried of the dye layer may be the same as that adopted for DVD-R.

The recording layer according to this invention may contain a singlet oxygen quencher, a light absorbent, a radical scavenger, etc.

The optical information recording medium according to this invention may include a reflection layer in addition to the recording layer. This reflection layer may be provided on its surface with a protective layer. This protective layer may also be deposited on the exposed surface (the surface from which a laser beam is irradiated) of the substrate.

As for the reflection layer, a film of high reflectivity, such as a metallic film may be employed. This metallic film can be formed by the vapor-deposition or sputtering of a metal such as Au, Al, Ag, Cu, Pt, an alloy comprising any of these metals or other kinds of metal, or an alloy containing other trace component. The protective layer is formed for the purpose of protecting or improving the optical information recording medium, and can be formed by coating a solution of a radiation cure type resin (such as an ultraviolet cure type resin) on a given surface by means of spin coating for instance and then curing the coated layer.

As a result, an optical disk comprising a substrate provided on its surface with a recording layer, an reflection layer and any other optional layer such as a protective layer can be obtained. The optical disk comprising at least a recording layer as an essential layer and any other optional layer(s) may be superimposed on another optical disk comprising at least a recording layer as an essential layer and any other optional layer(s), or one substrate may be laminated on another substrate of an optical information recording medium.

The adhesives and methods for forming this laminated structure may be suitably selected by making use of an ultraviolet-curing resin, a cationic-curing resin, a-pressure sensitive adhesive double coated tape, a hot-melt method, a spin-coating method, a dispense method (extrusion method), a screen printing method, a roll coating method, etc.

DETAILED DESCRIPTION OF THE INVENTION

This invention will be further explained in detail with reference to the following preferred embodiments.

A polycarbonate substrate provided with a track pitch 0.74 $\mu$m in length (it may be 0.80 $\mu$m) and only wobble signal (pre-pit may also be included) was employed. Trimethine-based cyanine dyes for the dye layer of a recording layer were selected as follows. Namely, dyes represented by the aforementioned general formula [1] where (1) "A" is formed of a combination of the general formulas [2] and [3], "A'" is formed of a combination of the general formulas [6] and [7], (2) $D_1$ and $D_2$ are both hydrogen atom, or (3) $D_1$ is a lower alkyl such as methyl and p is 1 and $D_2$ is hydrogen atom or a lower alkyl such as methyl and q is 1 (in this case, each of "A" and "A'" is preferably benzene ring), (4) R and R' are the same or different from each other and are individually a lower alkyl such as ethyl, butyl, amyl, etc., (5) $X^-$ is an anion of perchloric acid or of iodine were selected. Then, a solution of dye meeting the aforementioned conditions (1) to (5) was respectively prepared and coated on the polycarbonate substrate to form a dye layer. Thereafter, a reflection layer consisting of Au or Al was deposited on the dye layer by means of sputtering. A protective layer comprising an ultraviolet-curing resin was further spin-coated on the reflection layer. Then, a pair of the optical disks thus obtained were superimposed via an adhesive layer comprising an ultraviolet-curing resin which was spin-coated on the polycarbonate substrate, thereby obtaining a laminated-disk type optical disk.

Each of the dyes employed herein is formed of a molecule whose backbone chain is consisted of trimethine chain having three carbon atoms, to which functional groups are added, thereby making it possible to confine the maximum absorption wavelength to a range of 500 to 655 nm, in particular to a range of 560 to 615 nm, and also to confine the optical parameters to 1.6<n<4.0 and 0.01<k<0.45, in particular to 2.1<n<2.7 and 0.03<k<0.41. Accordingly, it is possible to select only one kind of dye as a single dye component, and it is also possible to select a plurality of dyes which are mixed together to obtain an optimal optical parameters falling within the aforementioned ranges. Especially, it is possible to optimize the optical parameters in the wavelength range of 620 to 690 nm, thus making it possible to provide a DVD-R which enables the recording and reproducing to be performed with a laser beam of 620 to 690 nm, in particular 630 to 670 nm in wavelength.

If the optical parameters can be optimized, the adjustment of the sensitivity of the tracking signal represented for example by the push-pull as well as the adjustment of reflectance would become easy. When a trimethine-based dye which is asymmetric in ring structure is employed singly for a recording layer, the absorption wavelength distribution of the recording layer to a laser beam would become sharp, i.e. the skirt portion of the spectrum becomes short due to its association state, etc. Namely, when the absorption spectrum is sharp as mentioned above, the absorbency per unit film thickness of the dye layer would be improved, thus enhancing the recording efficiency. It is impossible, when a trimethine-based dye of symmetric type (i.e. symmetrical in ring structure) is employed, to adjust the optical parameters unless a plurality of trimethine-based dyes differing in kind from each other are employed and mixed together, whereas in the case of a trimethine-based dye of asymmetric type (i.e. asymmetrical in ring structure) is employed, the optical parameters thereof can be adjusted by itself so that additional material is no more required for the adjustment of the optical parameters. Therefore, it is possible to employ only a single dye component, thus improving the recording efficiency, suppressing a heat accumulation and making it possible to record a much lower jitter.

This invention will be further explained in detail with reference to the following examples.

EXAMPLE 1

A transparent polycarbonate substrate having a thickness of 0.6 mm, an outer diameter of 120 mm and provided with a spiral groove 0.32 μm in width, 100 nm in depth and 0.74 μm in pitch was molded by means of an injection molding method.

Then, a trimethine-based cyanine dye represented by the following general formula [10] (NK-4285, n=2.70, k=0.41 in a wavelength of 635 nm; Japanese Research Institute for Photosensitizing Dye Co., Ltd.) and a trimethine-based cyanine dye represented by the following general formula [11] (NK-4270, n=2.41, k=0.0 in a wavelength of 635 nm; Japanese Research Institute for Photosensitizing Dye Co., Ltd.) were mixed together at a weight ratio of 25:75 to obtain a mixture. Then, this mixture was dissolved in 2,2,3,3-tetrafluoro-1-propanol (Tokyo Kasei Kogyo Co., Ltd.; hereinafter referred to as TFP) to obtain a solution containing 3% by weight of the aforementioned mixture. This solution was then coated on the substrate by means of a spin-coating method to obtain a recording layer consisting of a photosensitive dye film having a film thickness of 110 nm.

The maximum absorption wavelength and optical parameters of this recording layer were measured by irradiating a laser beam having a wavelength of 635 nm, the results being shown in Table 1. It will be seen from the results that the optical parameters "n" and "k" meet the conditions of $1.6<n<4.0$ and $0.01<k<0.45$.

Figure 5:
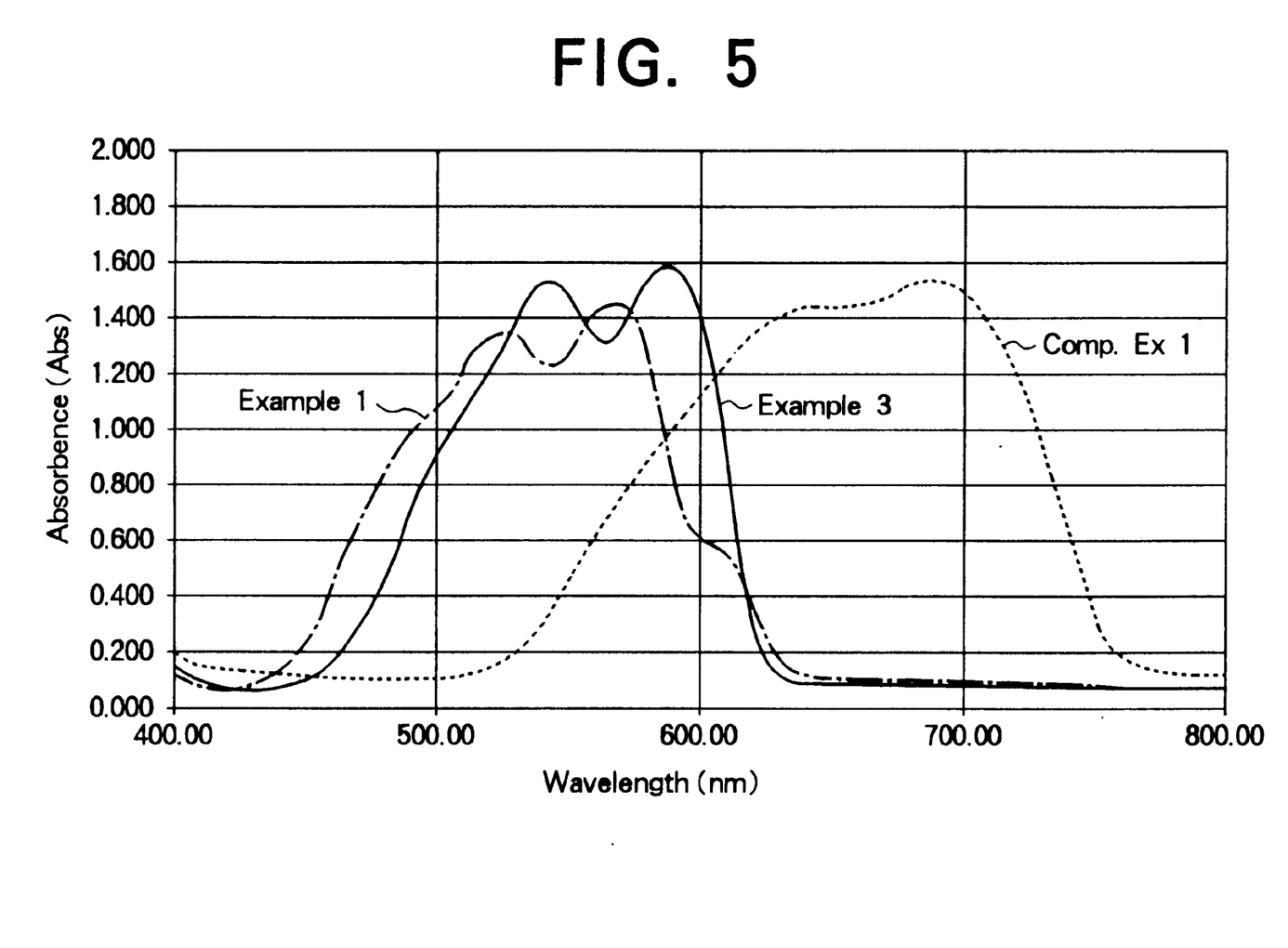
FIG. 5 is a graph showing the absorption spectra of the photosensitive dye films obtained in Examples of this invention and Comparative Examples.

When the absorption spectrum of the recording layer (the wavelength dependency of the absorbency (Abs) under a laser beam wavelength ranging from 400 to 800 nm) was measured by making use of a visible ultraviolet spectrometer (U-4000; Hitachi, Ltd.) to obtain the results as shown in a broken line in FIG. 5. As seen from FIG. 5, the maximum absorption peak wavelength and the second largest absorption peak wavelength of this recording layer fall within the range of 500 to 655 nm.

Next, a reflection layer consisting of an Au film having a film thickness of 80 nm was formed, by means of sputtering method, on the surface of a portion (a region 44 mm to 117 mm in diameter) of the recording layer deposited on the substrate.

Furthermore, an ultraviolet-curing resin (SD-211; Dainippon Ink & Chemicals Inc.) was spin-coated on the surface of the reflection layer, and then allowed to cure by irradiating ultraviolet rays to the coated layer to obtain a protective film having a film thickness of 5 μm.

Then, an ultraviolet-curing resin (SD-318; Dainippon Ink & Chemicals Inc.) was dripped on the protective film on the portion of the recording layer. Thereafter, another substrate which was molded in the same manner as mentioned above was placed on the surface of the substrate carrying thereon the aforementioned ultraviolet-curing resin. After the resin interposed between these substrates was allowed to disperse by means of a spin-coating method, ultraviolet rays was irradiated, via the substrate which was molded in the same manner, to the ultraviolet-curing resin to cure it, thereby forming an adhesive region 25 μm in thickness and 32 mm to 120 mm in diameter and obtaining a laminated-disk type optical disk.

Then, a recording was performed on this optical disk by making use of a recording machine (DDU-1000; numerical aperture=0.6, and laser wavelength=635 nm; Pulsetec Industria Co., Ltd.) under a linear velocity of 3.5 m/sec., and the jitter was measured by making use of a time interval analyzer (TA-320; Yokogawa Electric Co., Ltd.). According to the specification of disc, the Data to Clock Jitter (jitter) is a data which can be obtained by normalizing the deviation value σ of the binarize.data.edge signal by taking the channel bit length=38.23 nsec. as 100%. The evaluation of jitter is determined based on g-16 signal modulation where the minimum pit length is set to 0.4 μm and the linear velocity is set to 3.5/sec. The value of jitter should be at most 8% or preferably 8% or less in view of preventing an accidental demodulation (decord) of the signal.

Figure 6:
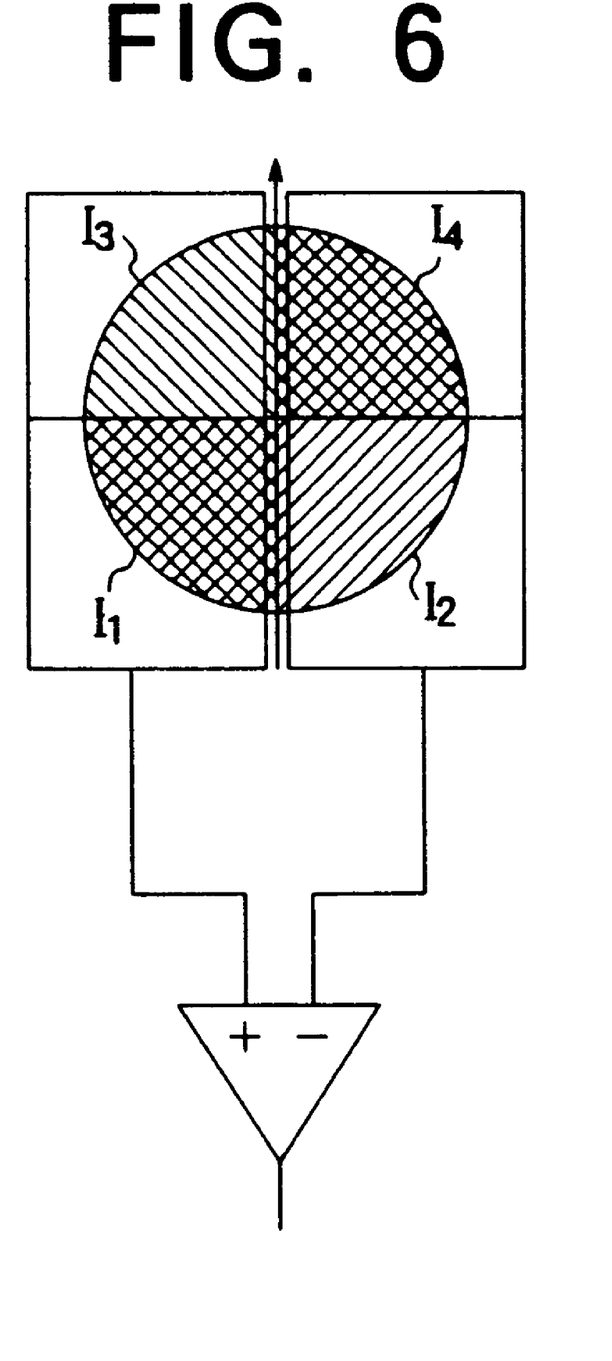
FIG. 6 is a plan view for illustrating method of calculating the push-pull.

The push-pull (to be referred to as PP hereinafter) which indicates the tracking sensitivity was measured and evaluated by making use of a laser beam 650 nm in wavelength. In this measurement, a laser beam (circular) was irradiated onto the groove and the reflected light from a detector which was partitioned into four sections (a four-partitioned photodetector) was converted into an electric voltage, the resultant value being represented by $(I_1+I_3)-(I_2+I_4)/(I_1+I_2+I_3+I_4)$. The arrow of Y-axis denotes a tangential direction. If this PP is too low, it is impossible to perform the tracking. Therefore, the value of PP should preferably be 0.13 or more. Furthermore, the reflectance and the modulated amplitude after recording ($I_3/I_{top}$, $I_{14}/I_{top}$) were also measured by making use of a laser beam 650 nm in wavelength.

In this case, the value of $I_{top}$ is a maximum reflection light quantity under HF (EFM) signal and almost identical with the value of a maximum reflection light quantity of $I_{14}$. $I_3$ is a signal of optical modulation component which can be derived from a difference in light quantity between the light quantity that is diffracted at the shortest pit to be recorded in the groove to be recorded and then returned to the objective lens and the light quantity that is reflected at the non-pit portion and then returned to the objective lens. $I_{14}$ is a signal of optical modulation component which can be derived from a difference in light quantity between the light quantity that is diffracted at the longest pit to be recorded in the groove to be recorded and then returned to the objective lens and the light quantity that is reflected at the non-pit portion and then returned to the objective lens.

If the reflectance is too low, the focus would become unstable. Therefore, the reflectance should preferably be 45% or more. The results of the measurements as illustrated above are shown in Table 1.

In this Example, a mixture consisting of two kinds of dyes each being symmetrical in ring structures which are disposed on both sides of the trimethine chain was employed. However, it was possible to perform the recording with a laser beam of 635 nm in wavelength and to perform the reproducing with a laser beam of 650 nm in wavelength. It will be seen that the reflectance, push-pull and modulated amplitude were all high, but the jitter was not so high. The fact that the jitter was not so high means that the accumulation of heat was also not so high. Excellency in modulated amplitude and in jitter means that the play-back (reproduction) sensitivity is good.

EXAMPLE 2

An optical disk was manufactured in the same manner as illustrated in Example 1 except that the sputtering was performed by substituting Al for Au and a reflection layer consisting of an Al film having a thickness of 80 nm was formed. The recording was also performed in the same manner as illustrated in Example 1. The results of measurements obtained are shown in Table 1.

Although the material for the reflection layer was altered from that employed in Example 1, it was possible to perform the recording with a laser beam of 635 nm in wavelength and to perform the reproducing with a laser beam of 650 nm in wavelength. Jitter was not so high, and the push-pull, modulated amplitude and reflectance were found to be inferior more or less as compared with those of Example 1, but they were not so bad.

EXAMPLE 3

A trimethine-based cyanine dye represented by the following general formula [12] (NK-4321; Japanese Research Institute for Photosensitizing Dye Co., Ltd.) was dissolved in TFP to obtain a solution containing 3% by weight of the aforementioned dye. This solution was then coated on the same kind of substrate as employed in Example 1 by means of a spin-coating method to obtain a recording layer consisting of a photosensitive dye film having a film thickness of 90 nm.

The maximum absorption wavelength (the maximum absorption peak wavelength) and optical parameters of this recording layer were measured in the same manner as illustrated in Example 1 by irradiating a laser beam having a wavelength of 635 nm, the results being shown in Table 1. Further, the absorption spectrum of the recording layer was measured in the same manner as illustrated in Example 1 to obtain the results as shown in a solid line in FIG. 5. As seen from FIG. 5, the maximum absorption peak wavelength and the second largest absorption peak wavelength of this recording layer fall within the range of 500 to 655 nm.

Next, a reflection layer consisting of an Au film having a film thickness of 80 nm was formed, by means of sputtering method, on the surface of a portion (a region 44 mm to 117 mm in diameter) of the recording layer deposited on the substrate.

Furthermore, an ultraviolet-curing resin (SD-211; Dainippon Ink & Chemicals Inc.) was spin-coated on the surface of the reflection layer in the same manner as illustrated in Example 1.

Then, a laminated-disk type optical disk was manufactured in the same manner as illustrated in Example 1 by superimposing a pair of the substrates with an ultraviolet-curing resin being interposed therebetween.

Then, a recording was performed on this optical disk in the same manner as illustrated in Example 1. The results of the measurements are shown in Table 1.

In this Example, a dye which is asymmetrical in ring structures disposed on both sides of the trimethine chain was employed. However, it was possible to perform the recording with a laser beam of 635 nm in wavelength and to perform the reproducing with a laser beam of 650 nm in wavelength. It will be seen that the push-pull was high, but the jitter was low, and that the modulated amplitude was large and the reflectance was not so small. The fact that the jitter was low means that the accumulation of heat was also low. Excellency in modulated amplitude and in jitter means that the play-back (reproduction) sensitivity is good.

EXAMPLE 4

An optical disk was manufactured in the same manner as illustrated in Example 3 except that the sputtering was performed by substituting Al for Au and a reflection layer consisting of an Al film having a thickness of 80 nm was formed. The measurements were performed also in the same manner as illustrated in Example 1. The results of measurements obtained are shown in Table 1.

Although the material for the reflection layer was altered from that employed in Example 3, it was possible to perform the recording with a laser beam of 635 nm in wavelength and to perform the reproducing with a laser beam of 650 nm in wavelength. Jitter was very small, and the push-pull, modulated amplitude and reflectance were found to be inferior more or less as compared with those of Example 3, but they were not so bad.

EXAMPLE 5

A trimethine-based cyanine dye represented by the aforementioned general formula [12] (NK-4321) and a trimethine-based cyanine dye represented by the aforementioned general formula [10] (NK-4285) were mixed together at a weight ratio of 75:25 to obtain a mixture. This mixture was then dissolved in TFP to obtain a solution containing 3% by weight of the aforementioned mixture of dyes. This solution was then coated on a substrate by means of a spin-coating method to obtain a recording layer consisting of a photosensitive dye film having a film thickness of 100 nm.

The maximum absorption wavelength and optical parameters of this recording layer were measured in the same manner as illustrated in Example 1 by irradiating a laser beam having a wavelength of 635 nm, the results being shown in Table 1.

Next, a reflection layer consisting of an Au film having a film thickness of 90 nm was formed, by means of sputtering method, on the surface of a portion (a region 44 mm to 117 mm in diameter) of the recording layer deposited on the substrate.

Furthermore, an ultraviolet-curing resin was spin-coated on the surface of the reflection layer in the same manner as illustrated in Example 1. Then, a laminated-disk type optical disk was manufactured in the same manner as illustrated in Example 1 by superimposing a pair of the substrates with an ultraviolet-curing resin being interposed therebetween.

Then, a recording was performed on this optical disk in the same manner as illustrated in Example 1. The results of the measurements are shown in Table 1.

In this Example, a mixture of two kinds of dye was employed, wherein one of the dyes was asymmetrical in ring structures disposed on both sides of the trimethine chain was employed (the same as employed in Example 3), whereas the other one of the dyes was symmetrical in ring structures disposed on both sides of the trimethine chain was employed (the one employed in Example 1). Furthermore, with a view to slightly adjust the optical parameters, a little amount of the latter dye was added to the former dye. It was also possible to perform the recording with a laser beam of 635 nm in wavelength and to perform the reproducing with a laser beam of 650 nm in wavelength. It will be seen that the jitter was low, the reflectance, push-pull and modulated amplitude were not so bad.

EXAMPLE 6

An optical disk was manufactured in the same manner as illustrated in Example 5 except that the sputtering was performed by substituting Al for Au and a reflection layer consisting of an Al film having a thickness of 80 nm was formed. The recording was performed and then measurements was performed in the same manner as illustrated in Example 1. The results of measurements obtained are shown in Table 1.

Although the material for the reflection layer was altered from that employed in Example 5, it was possible to perform the recording with a laser beam of 635 nm in wavelength and to perform the reproducing with a laser beam of 650 nm in wavelength. Jitter was very small, and the push-pull, modulated amplitude and reflectance were found to be inferior more or less as compared with those of Example 5, but they were not so bad.

EXAMPLE 7

A trimethine-based cyanine dye represented by the aforementioned general formula [10] (NK-4285) was dissolved in a Cellosolve-based solvent to obtain a solution containing 3% by weight of the aforementioned dye. This solution was then coated on the surface of a substrate by means of a spin-coating method to obtain a recording layer consisting of a photosensitive dye film having a film thickness of 40 nm.

The maximum absorption wavelength and optical parameters of this recording layer were measured in the same manner as illustrated in Example 1 by irradiating a laser beam having a wavelength of 635 nm, the results being shown in Table 1.

Next, a reflection layer consisting of an Au film having a film thickness of 80 nm was formed, by means of sputtering method, on the surface of a portion (a region 44 mm to 117 mm in diameter) of the recording layer deposited on the substrate.

Furthermore, an ultraviolet-curing resin was spin-coated on the surface of the reflection layer in the same manner as illustrated in Example 1. Then, a laminated-disk type optical disk was manufactured in the same manner as illustrated in Example 1 by superimposing a pair of the substrates with an ultraviolet-curing resin being interposed therebetween.

Then, a recording was performed on this optical disk in the same manner as illustrated in Example 1. The results of the measurements are shown in Table 1.

In this Example, a dye which is symmetrical in ring structures disposed on both sides of the trimethine chain was employed. However, it was possible to perform the recording with a laser beam of 635 nm in wavelength and to perform the reproducing with a laser beam of 650 nm in wavelength. It will be seen that the push-pull, reflectance, the modulated amplitude at the occasion of reproduction and jitter cannot be said as being better than those of the aforementioned Examples. However, the reflectance was not so bad and the modulated amplitude as well as the jitter were not unmeasurable as that of Comparative Example to be discussed later.

EXAMPLE 8

An optical disk was manufactured in the same manner as illustrated in Example 7 except that the sputtering was performed by substituting Al for Au and a reflection layer consisting of an Al film having a thickness of 80 nm was formed. The recording was performed and then measurements was performed in the same manner as illustrated in Example 1. The results of measurements obtained are shown in Table 1.

Although the material for the reflection layer was altered from that employed in Example 7, it was possible to perform the recording with a laser beam of 635 nm in wavelength and to perform the reproducing with a laser beam of 650 nm in wavelength. The push-pull and modulated amplitude were found to be inferior more or less as compared with those of Example 7, but they were not so bad. With regard to the reflectance and jitter, they are almost the same as those of Example 7.

EXAMPLE 9

An optical disk was manufactured in the same manner as illustrated in Example 7 except that a trimethine-based cyanine dye represented by the following general formula [13] was substituted for the dye represented by the aforementioned general formula [10]. The recording was performed and then measurements was performed in the same manner as illustrated in Example 1. The results of measurements obtained are shown in Table 1. The maximum absorp- tion wavelength and optical parameters of this recording layer were measured in the same manner as illustrated in Example 1 by irradiating a laser beam having a wavelength of 635 nm, the results being shown in Table 1.

In this Example, a dye employed herein is symmetrical in ring structures disposed on both sides of the trimethine chain and differs from the compound represented by the general formula [10] in the respect that methyl group is attached or not attached to the benzene ring in A' of the general formula [1]. However, it was possible to perform the recording with a laser beam of 635 nm in wavelength and to perform the reproducing with a laser beam of 650 nm in wavelength. It will be seen that the push-pull and reflectance were almost the same as those of Example 7, the modulated amplitude at the occasion of reproduction was more excellent as compared with that of Example 7, the jitter cannot be said as being better than that of the aforementioned Examples. However, the jitter was not unmeasurable as that of Comparative Example to be discussed later.

[13]

It was also confirmed that even if a dye represented by the following general formula [14] was substituted for the aforementioned dye represented by the general formula [13], almost the same results were obtained.

[14]

EXAMPLE 10

An optical disk was manufactured in the same manner as illustrated in Example 9 except that the sputtering was performed by substituting Al for Au and a reflection layer consisting of an Al film having a thickness of 80 nm was formed. The recording was performed and then measurements was performed in the same manner as illustrated in Example 1. The results of measurements obtained are shown in Table 1.

Although the material for the reflection layer was altered from that employed in Example 9, it was possible to perform the recording and reproducing with a laser beam of 650 nm in wavelength. The push-pull and modulated amplitude were found to be inferior more or less as compared with those of Example 9, but they were not so bad. With regard to the reflectance and jitter, they are almost the same as those of Example 9.

EXAMPLE 11

An optical disk was manufactured in the same manner as illustrated in Example 3 except that a trimethine-based cyanine dye represented by the following general formula [15] (NK-4370; Japanese Research Institute for Photosensitizing Dye Co., Ltd.) was substituted for the dye represented by the aforementioned general formula [12]. The recording was performed and then measurements was performed in the same manner as illustrated in Example 1. The results of measurements obtained are shown in Table 1. The maximum absorption wavelength and optical parameters of this recording layer were measured in the same manner as illustrated in Example 1 by irradiating a laser beam having a wavelength of 635 nm, the results being shown in Table 1.

In this Example, a dye employed herein is asymmetrical in ring structures disposed on both sides of the trimethine chain and differs from the compound represented by the general formula [12] in the kind of $X^-$ in the general formula [1], i.e. the anion is formed of perchloric acid or iodine. However, it was possible to perform the recording with a laser beam of 635 nm in wavelength and to perform the reproducing with a laser beam of 650 nm in wavelength. It will be seen that the reflectance, push-pull, the modulated amplitude and jitter were almost the same as those of Example 3.

[15]

EXAMPLE 12

An optical disk was manufactured in the same manner as illustrated in Example 11 except that the sputtering was performed by substituting Al for Au and a reflection layer consisting of an Al film having a thickness of 80 nm was formed. The recording was performed and then measurements was performed in the same manner as illustrated in Example 1. The results of measurements obtained are shown in Table 1.

Although the material for the reflection layer was altered from that employed in Example 13, it was possible to perform the recording with a laser beam of 635 nm in wavelength and to perform the reproducing with a laser beam of 650 nm in wavelength. Jitter was very small, and the push-pull, modulated amplitude and reflectance were found to be inferior more or less as compared with those of Example 13, but they were not so bad.

Comparative Example 1

A pentamethine-based cyanine dye represented by the following general formula [16] (NK-3219; Japanese Research Institute for Photosensitizing Dye Co., Ltd.) was dissolved in a Cellosolve-based solvent to obtain a solution containing 3% by weight of the aforementioned dye. This solution was then coated on the same kind of substrate as employed in Example 1 by means of a spin-coating method to obtain a recording layer consisting of a photosensitive dye film having a film thickness of 110 nm.

The maximum absorption wavelength and optical parameters of this recording layer were measured in the same manner as illustrated in Example 1 by irradiating a laser beam having a wavelength of 635 nm, the results being shown in Table 1. Further, the absorption spectrum of the recording layer was measured in the same manner as illustrated in Example 1 to obtain the results as shown in a broken line in FIG. 5. As seen from FIG. 5, the maximum absorption peak wavelength and the second largest absorption peak wavelength of this recording layer fall within the range of 600 to 750 nm.

Next, a reflection layer consisting of an Au film having a film thickness of 90 nm was formed, by means of sputtering method, on the surface of a portion (a region 44 mm to 117 mm in diameter) of the recording layer deposited on the substrate.

Furthermore, an ultraviolet-curing resin was spin-coated on the surface of the reflection layer in the same manner as illustrated in Example 1. Then, a laminated-disk type optical disk was manufactured in the same manner as illustrated in Example 1 by superimposing a pair of the substrates with an ultraviolet-curing resin being interposed therebetween.

Then, a recording was performed on this optical disk in the same manner as illustrated in Example 1. The results of the measurements are shown in Table 1.

In this Comparative Example, a dye employed was a pentamethine-based cyanine dye, and the maximum absorption wavelength was existed on a longer wavelength side. Additionally, the optical parameter "k" did not meet the condition of $0.01 < k < 0.45$. As a result, the reflectance was too low to obtain a data at the occasion of play-back and hence it was impossible to perform the play-back with a laser beam having a wavelength of 650 nm.

[16]

Comparative Example 2

A phthalocyanine dye represented by the following general formula [17] was dissolved in a Cellosolve-based solvent to obtain a solution containing 3% by weight of the aforementioned dye. This solution was then coated on the same kind of substrate as employed in Example 1 by means of a spin-coating method to obtain a recording layer consisting of a photosensitive dye film having a film thickness of 90 nm.

The maximum absorption wavelength and optical parameters of this recording layer were measured in the same manner as illustrated in Example 1 by irradiating a laser beam having a wavelength of 635 nm, the results being shown in Table 1.

Next, a reflection layer consisting of an Au film having a film thickness of 100 nm was formed, by means of sputtering method, on the surface of a portion (a region 44 mm to 117 mm in diameter) of the recording layer deposited on the substrate.

Furthermore, an ultraviolet-curing resin was spin-coated on the surface of the reflection layer in the same manner as illustrated in Example 1. Then, a laminated-disk type optical disk was manufactured in the same manner as illustrated in Example 1 by superimposing a pair of the substrates with an ultraviolet-curing resin being interposed therebetween.

Then, a recording was performed on this optical disk in the same manner as illustrated in Example 1. The results of the measurements are shown in Table 1. Since the reflectance and push-pull were too poor in this Comparative Example to perform the recording.

In this Comparative Example, a dye employed was a phthalocyanine dye instead of a cyanine dye having a methine chain. Additionally, the optical parameter "k" did not meet the condition of $0.01 < k < 0.45$. As a result, the reflectance was too low to obtain a data at the occasion of play-back and hence it was impossible to perform the play-back with a laser beam having a wavelength of 650 nm.

As explained above, it is more preferable in this invention that the reflectance should be not less than 45%, the push-pull should be not less than 0.13% (not less than 0.40 when both ring structures are asymmetrical or when compounds whose both ring structures are symmetrical are mixed together), the jitter is not more than 8% (not more than 7% when both ring structures are asymmetrical) and $I_{14}/I_{top}$ is not less than 60% or more preferably not less than 70%.

As explained above, according to this invention, a recording material exhibiting suitable optical parameters and a maximum absorption wavelength in relative to a laser beam of short wavelength for performing the recording and reproducing of high density is employed. Further, the selection of a recording material exhibiting suitable optical parameters is realized by suitably selecting the structure of a dye. Namely, a trimethine-based cyanine dye where the rings on both sides of trimethine chain exhibit asymmetrical structure is selected in this invention. As a result, it is no more required to another kind of material for controlling the optical parameters of the dye thereby making it possible to suppress the accumulation of heat at the occasion of recording and to record a low jitter, thus improving the recording sensitivity. It is also possible to obtain a suitable optical parameters and to adjust the recording sensitivity by suitably selecting a combination of the dye.

[17]

TABLE 1

|  |  | Max absorption wavelength λ (nm) | Optical parameters* n | Optical parameters* k | Reflectance (%) | Push-pull (%) | Modulated amplitude $I_3/I_{top}$ | Modulated amplitude $I_{14}/I_{top}$ | Jitter (%) | Recordability |
|---|---|---|---|---|---|---|---|---|---|---|
| Example | 1 | 575 | 2.50 | 0.10 | 80 | 0.50 | 24 | 85 | 8 | Yes |
|  | 2 | 575 | 2.50 | 0.10 | 70 | 0.45 | 23 | 70 | 8 | Yes |
|  | 3 | 585 | 2.42 | 0.05 | 65 | 0.50 | 25 | 84 | 6 | Yes |
|  | 4 | 585 | 2.42 | 0.05 | 60 | 0.40 | 23 | 70 | 7 | Yes |
|  | 5 | 585 | 2.43 | 0.07 | 60 | 0.45 | 27 | 84 | 7 | Yes |
|  | 6 | 585 | 2.43 | 0.07 | 55 | 0.40 | 26 | 70 | 7 | Yes |
|  | 7 | 615 | 2.70 | 0.41 | 50 | 0.25 | 15 | 70 | 8 | Yes |
|  | 8 | 615 | 2.70 | 0.41 | 50 | 0.20 | 12 | 60 | 8 | Yes |
|  | 9 | 562 | 2.12 | 0.03 | 50 | 0.30 | 25 | 82 | 8 | Yes |
|  | 10 | 562 | 2.12 | 0.03 | 50 | 0.25 | 22 | 72 | 8 | Yes |
|  | 11 | 585 | 2.68 | 0.10 | 65 | 0.50 | 25 | 83 | 7 | Yes |
|  | 12 | 585 | 2.68 | 0.10 | 60 | 0.40 | 24 | 70 | 7 | Yes |
| Comp. Ex. | 1 | 710 | 2.01 | 1.08 | 8 | 0.30 | — (Unmeasurable) | — | — | Yes |
|  | 2 | 673 | 1.58 | 0.53 | 10 | 0.30 | — (Unmeasurable) | — | — | Yes |

*Value obtained by laser beam of 635 nm wavelength

We claim:

1. An optical information recording medium provided on a substrate with a recording layer including a dye layer; wherein said dye layer contains a cyanine dye; and said recording layer enables a recording and reproducing to be effected with a laser beam having a wavelength falling within a range of 620 nm to 690 nm; a refractive index "n" of said recording layer being in a range of 1.6 to 4.0 and an extinction coefficient "k" of said recording layer being in a range of 0.01 to 0.45 when said laser beam having said wavelength is applied thereto; and said recording layer exhibiting a maximum absorption peak wavelength and a second largest absorption peak wavelength falling within a range of 500 nm to 655 nm as measured by means of a visible ultraviolet spectrometer.

2. The optical information recording medium according to claim 1, wherein said dye layer contains one or more kinds of trimethine-based cyanine dye.

3. The optical information recording medium according to claim 2, wherein said trimethine-based cyanine dye is a compound represented by the following general formula [1];

[1]

wherein "A" represents any one of the following general formulas [2], [3], [4] and [5];

[2]

[3]

[4]

[5]

"A'" represents any one of the following general formulas [6], [7], [8] and [9];

"A" and "A'" may be the same or different from each other (where $D_1$ and $D_2$ may be the same or different from each other and are individually hydrogen atom, alkyl, alkoxy, hydroxyl, halogen atoms, carboxyl, alkoxycarboxyl, alkylcarboxyl, alkylhydroxyl, aralkyl, alkenyl, alkylamide, alkylamino, alkylsufonamide, alkylcarbamoyl, alkylsulfamoyl, alkylsulfonyl, phenyl, cyano, ester, nitro, acyl, allyl, aryl, aryloxy, alkylthio, arylthio, phenylazo, pyridinoazo, alkylcarbonylamino, sulfonamide, amino, alkylsulfone, thiocyano, mercapt, chlorosulfone, alkylazomethine, alkylaminosulfone, vinyl or sulfone group; p and q respectively represents an integer of 1 or more); R and R' may be the same or different from each other and are individually substituted or unsubstituted alkyl, carboxyl, alkoxycarbonyl, alkoxycarboxyl, alkoxyl, alkylhydroxyl, aralkyl, alkenyl, alkylamide, alkylamino, alkylsufonamide, alkylcarbamoyl, alkylsulfamoyl, hydroxyl, halogen atoms, alkylalkoxyl, alkyl halide, alkylsulfonyl, alkylcarboxyl or alkylsulfonyl which are bonded to a metallic ion or alkyl, phenyl, benzyl or alkylphenyl group; and $X^-$ is an anion selected from the group consisting of halogen atoms, $PF_6^-$, $SbF_6^-$, $H_3PO_4$, perchloric acid, hydroborofluoric acid, benzenesulfonic acid, toluenesulfonic acid, alkylsulfonic acid, benzenecarboxylic acid, alkylcarboxylic acid, trifluoromethylcarboxylic acid, periodic acid and $SCN^-$.

4. The optical information recording medium according to claim 3, wherein said trimethine-based cyanine dye is an asymmetry trimethine cyanine dye wherein a ring structure "A" differs from a ring structure "A'".

5. The optical information recording medium according to claim 3, wherein said dye layer contains a trimethine-based cyanine dye comprising a combination of said general formulas [2] or [3] and said general formulas [6] or [7].

6. The optical information recording medium according to claim 5, wherein $D_1$ in said general formulas [2] or [3] and $D_2$ in said general formulas [6] or [7] are both hydrogen atom.

7. The optical information recording medium according to claim 5, wherein $D_1$ in said general formulas [2] or [3] is a lower alkyl group and p is 1, and $D_2$ in said general formulas [6] or [7] is hydrogen atom or a lower alkyl group and q is 1.

8. The optical information recording medium according to claim 5, 6 or 7 wherein said trimethine-based cyanine dye is formed of a combination of said general formulas [2] or [6].

9. The optical information recording medium according to claim 6 or 7 wherein said R and R' is the same or different from each other and are individually a lower alkyl group.

10. The optical information recording medium according to claim 8 wherein said R and R' is the same or different from each other and are individually a lower alkyl group.

11. The optical information recording medium according to claim 9 wherein said $X^-$ is an anion of perchloric acid or an anion of iodine.

12. The optical information recording medium according to claim 10 wherein said $X^-$ is an anion of perchloric acid or an anion of iodine.

13. The optical information recording medium according to claim 1, wherein said dye layer contains a trimethine-based cyanine dye comprising a combination compounds represented by the following general formulas [10] and [11], which are mixed at a weight ratio of 25:75.

14. The optical information recording medium according to claim 1, wherein said dye layer contains a trimethine-based cyanine dye comprising a compound represented by the following general formula [12].

15. The optical information recording medium according to claim 1, wherein said dye layer contains a trimethine-based cyanine dye comprising a combination compounds represented by the following general formulas [12] and [10], which are mixed at a weight ratio of 75:25.

[12]

[10]

16. The optical information recording medium according to claim 1, wherein said dye layer contains a trimethine-based cyanine dye comprising a compound represented by the following general formula [10].

[10]

17. The optical information recording medium according to claim 1, wherein said dye layer contains a trimethine-based cyanine dye comprising a compound represented by the following general formula [13] or [14].

[13]

[14]

18. The optical information recording medium according to claim 1, wherein said dye layer contains a trimethine-based cyanine dye comprising a compound represented by the following general formula [15].

[15]

19. The optical information recording medium according to claim 1, 2, 3, 4, 5, 6, 7, 13, 14, 15, 16 or 17 which further comprises an reflection layer made of gold or aluminum.

20. The optical information recording medium according to claim 8 which further comprises a reflection layer made of gold or aluminum.

21. The optical information recording medium according to claim 9 which further comprises an reflection layer made of gold or aluminum.

22. The optical information recording medium according to claim 10 which further comprises an reflection layer made of gold or aluminum.

23. The optical information recording medium according to claim 11 which further comprises an reflection layer made of gold or aluminum.

24. The optical information recording medium according to claim 12 which further comprises an reflection layer made of gold or aluminum.

* * * * *